US012763865B2

(12) United States Patent
Dore

(10) Patent No.: US 12,763,865 B2
(45) Date of Patent: Oct. 13, 2026

(54) SECURING CONTROL PANELS

(71) Applicant: Solid State Logic UK Limited, Oxford (GB)

(72) Inventor: Lance Patrick Dore, Finstock (GB)

(73) Assignee: Solid State Logic UK Limited, Oxford (GB)

( * ) Notice: Subject to any disclaimer, the term of this patent is extended or adjusted under 35 U.S.C. 154(b) by 190 days.

(21) Appl. No.: 18/735,724

(22) Filed: Jun. 6, 2024

(65) Prior Publication Data

US 2024/0430025 A1 Dec. 26, 2024

(30) Foreign Application Priority Data

Jun. 23, 2023 (GB) ..................................... 2309488

(51) Int. Cl.
*H04H 60/04* (2008.01)

(52) U.S. Cl.
CPC .................................. *H04H 60/04* (2013.01)

(58) Field of Classification Search
CPC ...................................................... H04H 60/04
See application file for complete search history.

(56) References Cited

U.S. PATENT DOCUMENTS 10,834,842 B1 * 11/2020 Elsasser ................. H05K 7/183
2003/0179546 A1 * 9/2003 Sugimoto ............ H05K 7/1427 361/679.02
2009/0241759 A1 * 10/2009 Natsume ................ H01C 10/38 84/633
2010/0097748 A1 * 4/2010 Ando ................... H05K 5/0226 361/679.01
2010/0188822 A1 7/2010 Ando
2013/0182872 A1 * 7/2013 Olswang ............... G06F 1/1632 381/119

FOREIGN PATENT DOCUMENTS

| | | |
|---|---|---|
| IT | 20156308 | 6/2017 |
| JP | H01232799 A | 9/1989 |
| JP | H0832256 A | 2/1996 |
| JP | 2002064280 A | 2/2002 |
| JP | 2006253607 A | 9/2006 |
| JP | 2016127159 A | 7/2016 |

OTHER PUBLICATIONS

Corresponding Great Britain Patent Application No. GB2309488.1, Search Report dated Dec. 15, 2023.
Corresponding Great Britain Patent Application No. GB2406854.6, Search Report dated Oct. 23, 2024.

* cited by examiner

*Primary Examiner* — Oyesola C Ojo
(74) *Attorney, Agent, or Firm* — Cooper Legal Group LLC

(57) ABSTRACT

A control panel is secured in a signal mixing system. A barb extends downwards from a lower edge of a control panel. The barb is located into a slot included in a slidable element. The slidable element is retained within a channel defined by a first flange and a second flange. The slidable element is slid to retain the barb located in the slot and the slidable element is secured to prevent further sliding, thereby securing the barb.

20 Claims, 16 Drawing Sheets

SECURING CONTROL PANELS

CROSS REFERENCE TO RELATED APPLICATIONS

This application claims priority from United Kingdom Patent Application number 2309488.1, filed on Jun. 23, 2023 the whole contents of which are incorporated herein by reference.

TECHNICAL FIELD

The present invention relates to securing control panels and in particular to a method of removably securing a control panel within signal mixing equipment and an apparatus for securing a control panel within signal mixing equipment.

BACKGROUND OF THE INVENTION

It is known to provide signal mixing equipment, such as audio mixing desks, with control panels that can be secured in such a way that they can be removed for maintenance and repair. However, a problem with known mixing equipment of this type is that panels are usually secured by screws deployed through edge regions. These edge regions take up space which could otherwise be used for active regions of control panels. Furthermore, by the reduction or removal of these edges, the combined control panels are perceived more as a continuous surface of control devices. Furthermore, such an approach also improves the overall aesthetic look of control surfaces of this type.

BRIEF SUMMARY OF THE INVENTION

According to a first aspect of the present invention, there is provided an apparatus for securing a control panel forming part of a signal mixing system, comprising: a barb extending downwards from an upper edge of the control panel; a slidable element; a support member defining a channel for receiving said slidable element; and a securing device, wherein: said channel includes a first flange and a second flange for retaining said slidable element; said slidable element includes a slot for receiving said barb; such that: said barb is locatable through said slot; said slidable element is slidable to retain the barb after being located through the slot; and said securing device is operated to prevent further sliding of the slidable element to secure the barb after said barb has been retained by the slidable element.

In an embodiment, the apparatus of claim 1, further comprising one or more additional barbs, wherein each said one or more additional barbs is receivable within a respective slot in the slidable element. In an embodiment, a total of three barbs and three slots are provided. The slots may be of substantially similar size. However, in an embodiment, the barbs are of mutually different sizes, with respective slots also being of mutually different sizes.

In an embodiment, the channel includes a first channel wall and a second channel wall; the first flange extends from the first channel wall and the second flange extends from the second channel wall; and the first channel wall and said second channel wall are of a similar size, to facilitate the securing of a second co-planar control panel. In an alternative embodiment, the first channel wall and the second channel wall are of different sizes to facilitate the securing of a second inclined control panel.

In an embodiment, the support member is secured between a first primary support and a second primary support. One or more additional support members may be secured between said first primary support and said second primary support. The control panel may be secured between adjacent support members. The primary supports may be secured to a support frame. The control panel may comprise a metal control surface; that includes holes for receiving control devices; and the barb formed as an extension of said metal control surface.

According to a second aspect of the invention, there is provided a method of securing a control panel in a signal mixing system, comprising the steps of: locating a barb extending downwards from an upper edge of the control panel, into a slot included in a slidable element, wherein the slidable element is retained within a channel defined by a first flange and a second flange; sliding the slidable element to retain the barb located in the slot; and securing the slidable element to prevent further sliding of said slidable element, thereby securing the barb.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
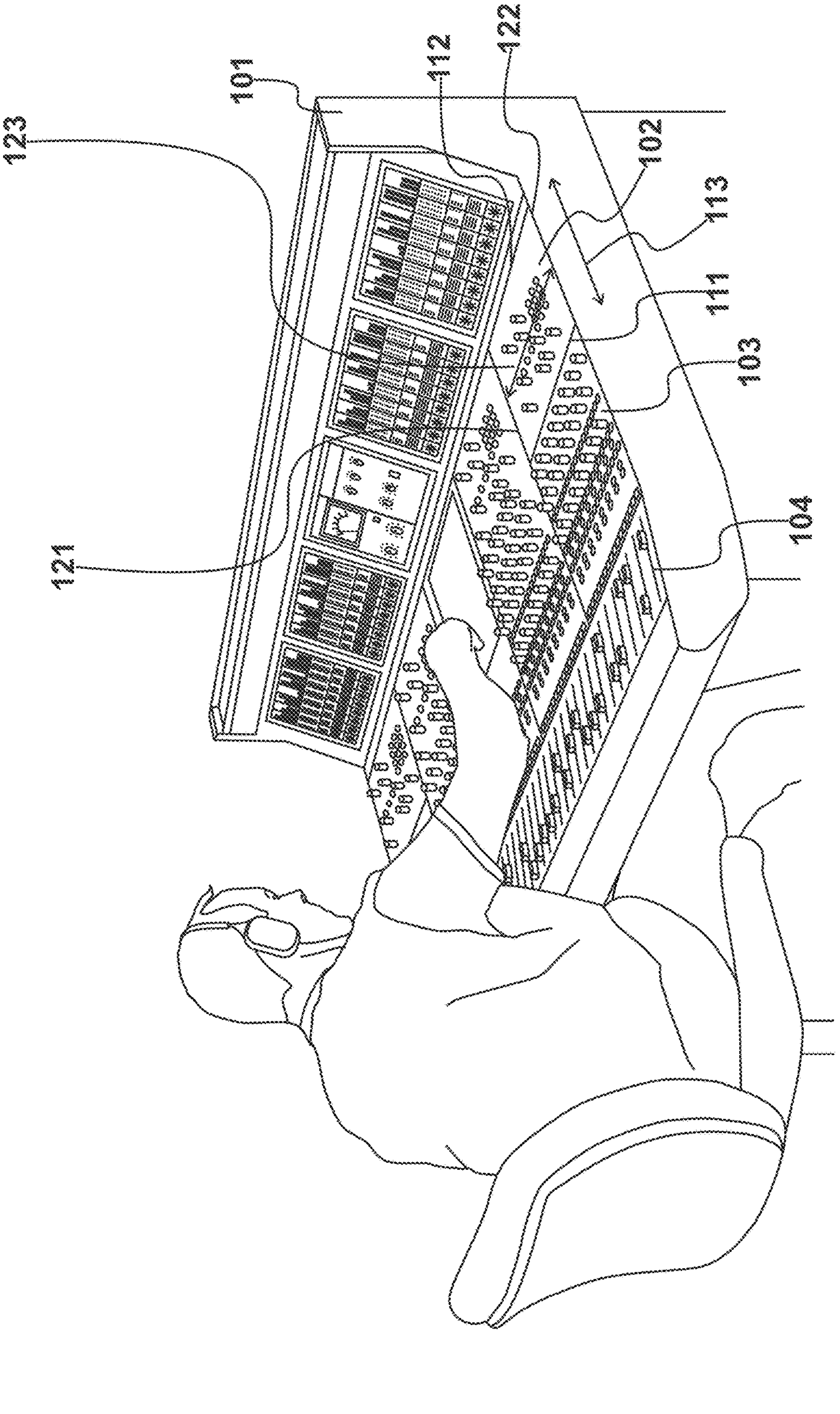
FIG. 1 shows signal mixing equipment, having a plurality of control panels.

A signal mixing system 101 is shown in FIG. 1, having a plurality of control panels 102, 103 of substantially similar size arranged in a grid. At least one of the panels includes a plurality of linear controllers 104 for controlling the volume of an audio signal. In an embodiment, audio signals are supplied to the mixing equipment and the mixing of the audio signals is implemented in response to manual operations made by an operative upon one or more of the control panels. Thus, each control panel has a lower edge 111 that is arranged closer to an operative compared to an opposite upper edge 112.

This example relates to the control and mixing of audio signals. However, the invention is also relevant to other types of control systems, such as those used for mixing video signals or for controlling industrial and energy generating processes.

Construction of the apparatus shown in FIG. 1 will be detailed with reference to FIGS. 2 to 12. This includes a description of an apparatus for securing the control panels within the signal mixing equipment. A distance between the lower edge 111 and the upper edge 112 defines a panel depth 113. In addition, each panel has a left edge 121 and a right edge 122, with the distance between them defining a panel width 123.

FIG. 2

Figure 2:
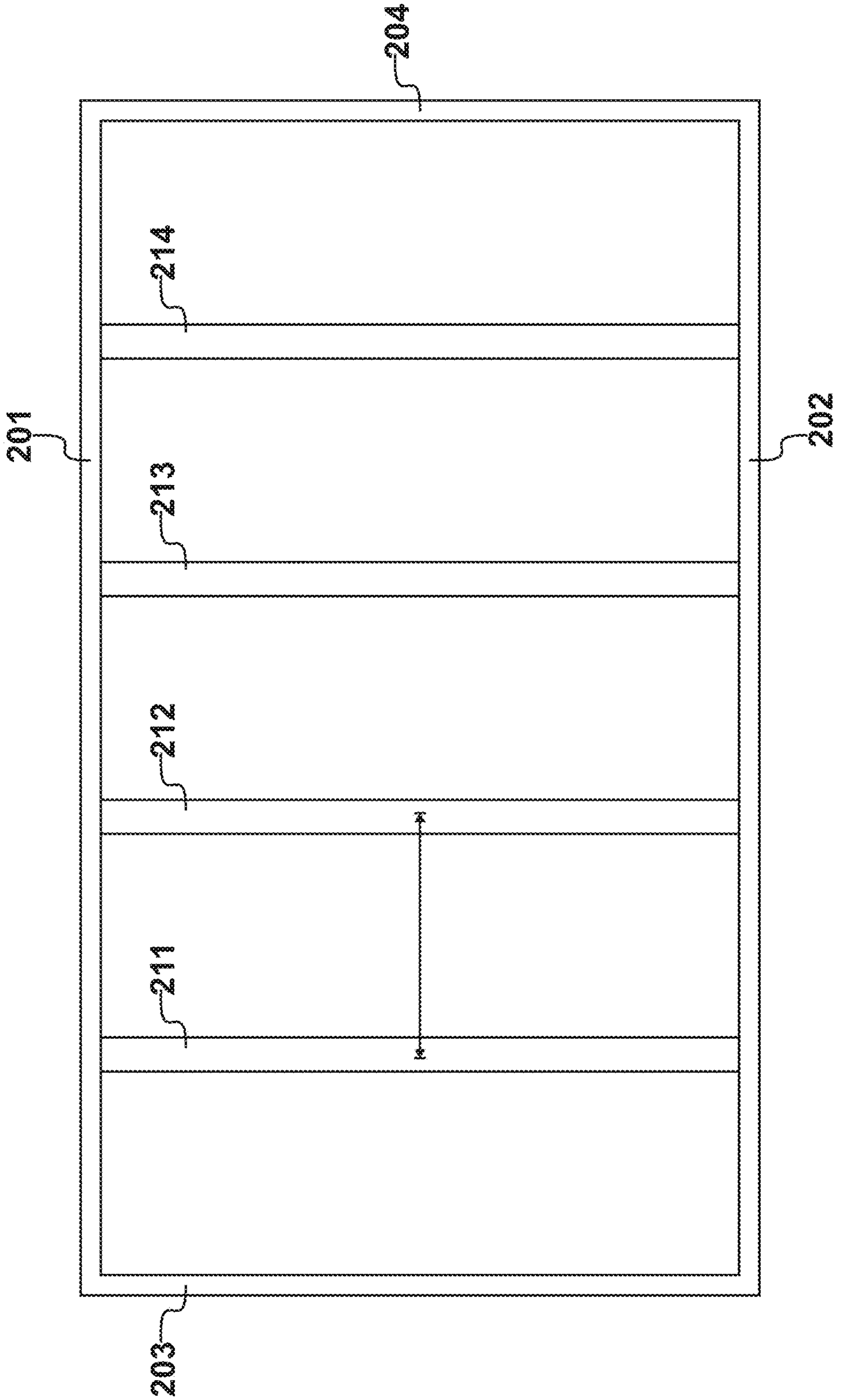
FIG. 2 shows the construction of the mixing apparatus identified in FIG. 1, having an upper frame portion, a lower frame portion and primary supports.

As illustrated in FIG. 2, the equipment is constructed from an upper frame portion 201, a lower frame portion 202, a left frame portion 203 and a right frame portion 204. A first primary support 211, a second primary support 212, a third primary support 213 and a fourth primary support 214 are attached between the upper frame portion 201 and the lower frame portion 202, such that a spacing 215 between adjacent primary supports is of a size substantially similar to that of the panel width 123. In the embodiment of FIG. 2, support members are secured between the primary supports.

FIG. 3

Figure 3:
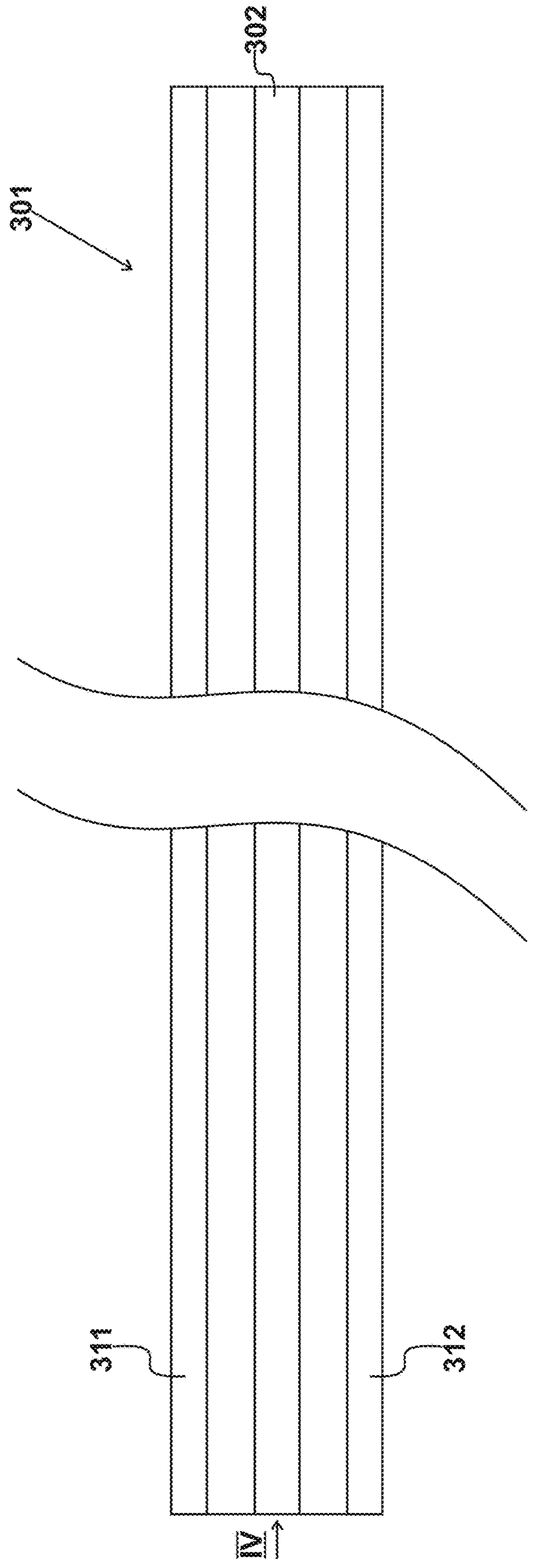
FIG. 3 shows a support member configured to be supported between two primary supports.

A support member 301 is shown in FIG. 3. This can be produced as an aluminium extrusion and defines a channel 302 for receiving a slidable element described with reference to FIG. 5. The support member 301 also defines a first flange 311 and a second flange 312 for restraining the slidable element within the channel 302. A cross-section of the upper support channel 302, as seen in the direction of arrow IV, is shown in FIG. 4.

FIG. 4

Figure 4:
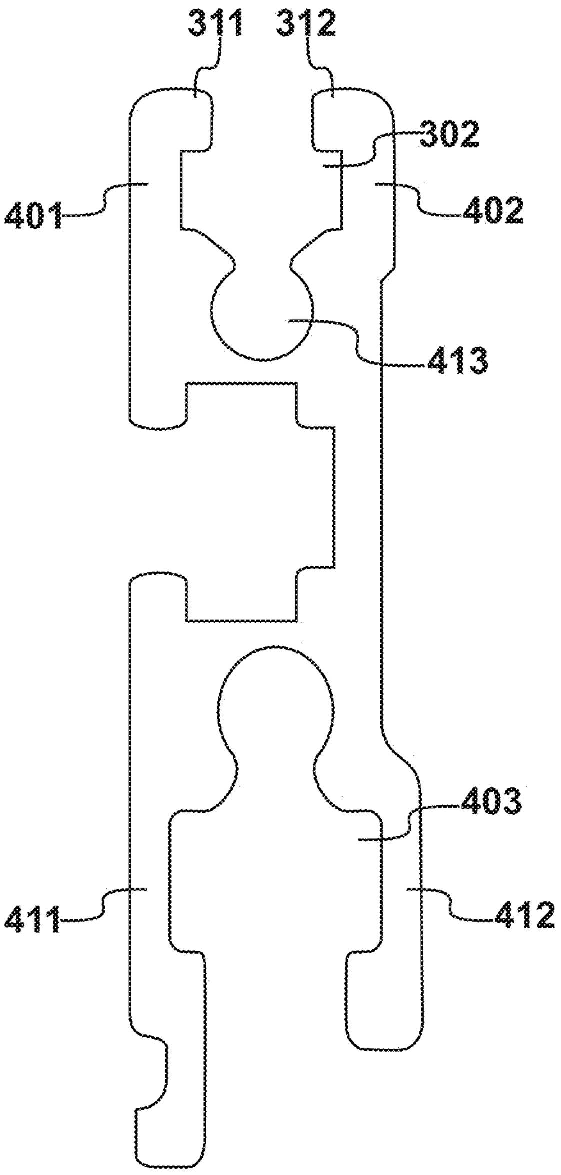
FIG. 4 shows a cross-sectional view of the support member identified in FIG. 3.

As shown in FIG. 4, the upper support channel 302 has a first channel wall 401 and a second channel wall 402. The first flange 311 extends from the first channel wall 401 and the second flange 312 extends from the second channel wall 402. The first channel wall 401 and the second channel wall 402 are substantially the same size, to facilitate the securing of a second coplanar control panel.

In this embodiment, the support member 301 is configured such that it may be used in an alternative configuration, effectively rotated through one hundred and eighty degrees from the orientation shown in FIG. 4, to present an alternative channel 403 in which a first alternative channel wall 411 is larger than a second alternative channel wall 412 to facilitate the securing of a second inclined control panel, of the type shown in FIG. 1.

The support member 301 also includes a recess 413 for receiving grub screws used to secure the slidable element; described with reference to FIG. 5.

FIG. 5

Figure 5:
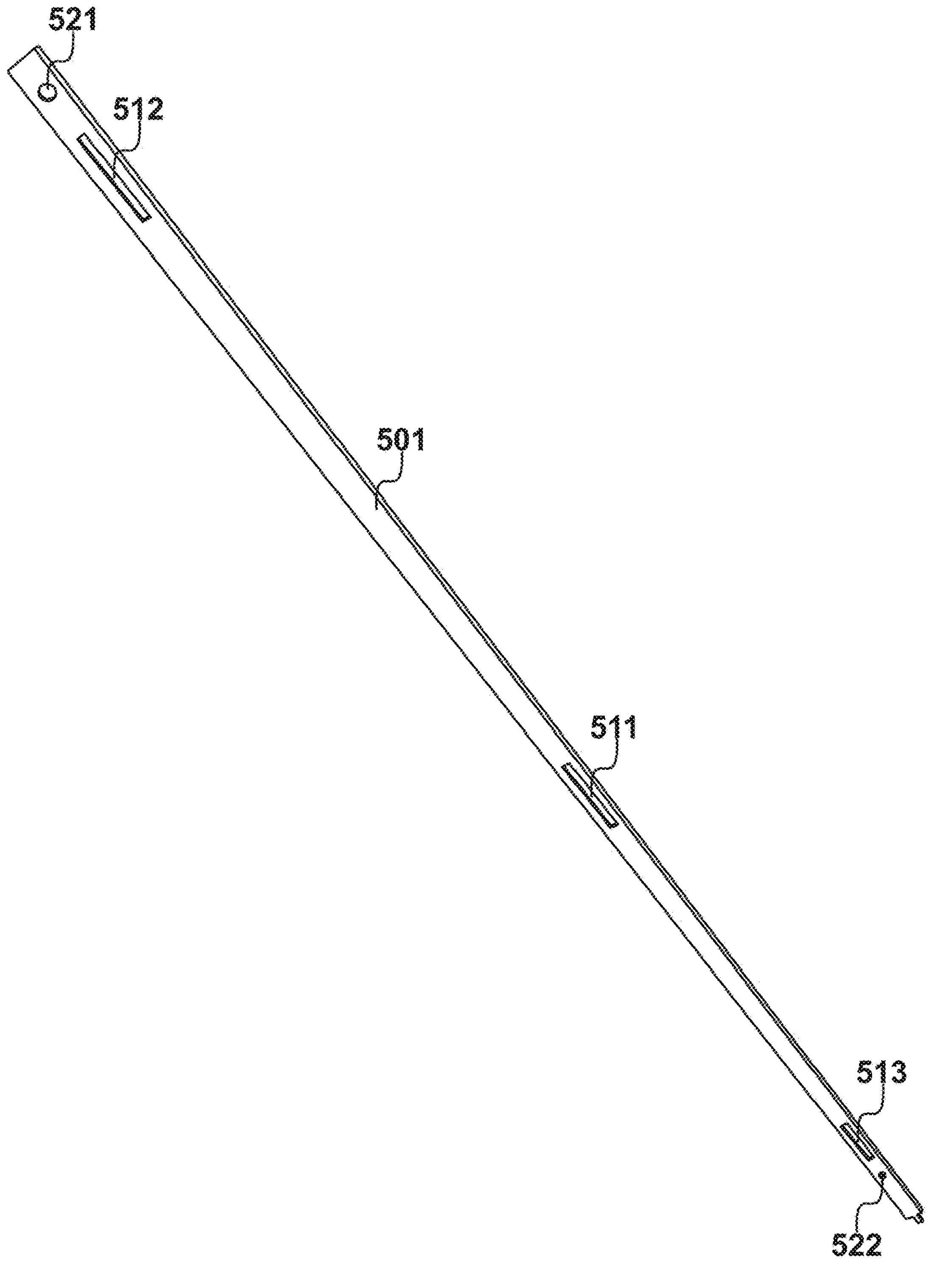
FIG. 5 shows a slotted element.
Figure 6:
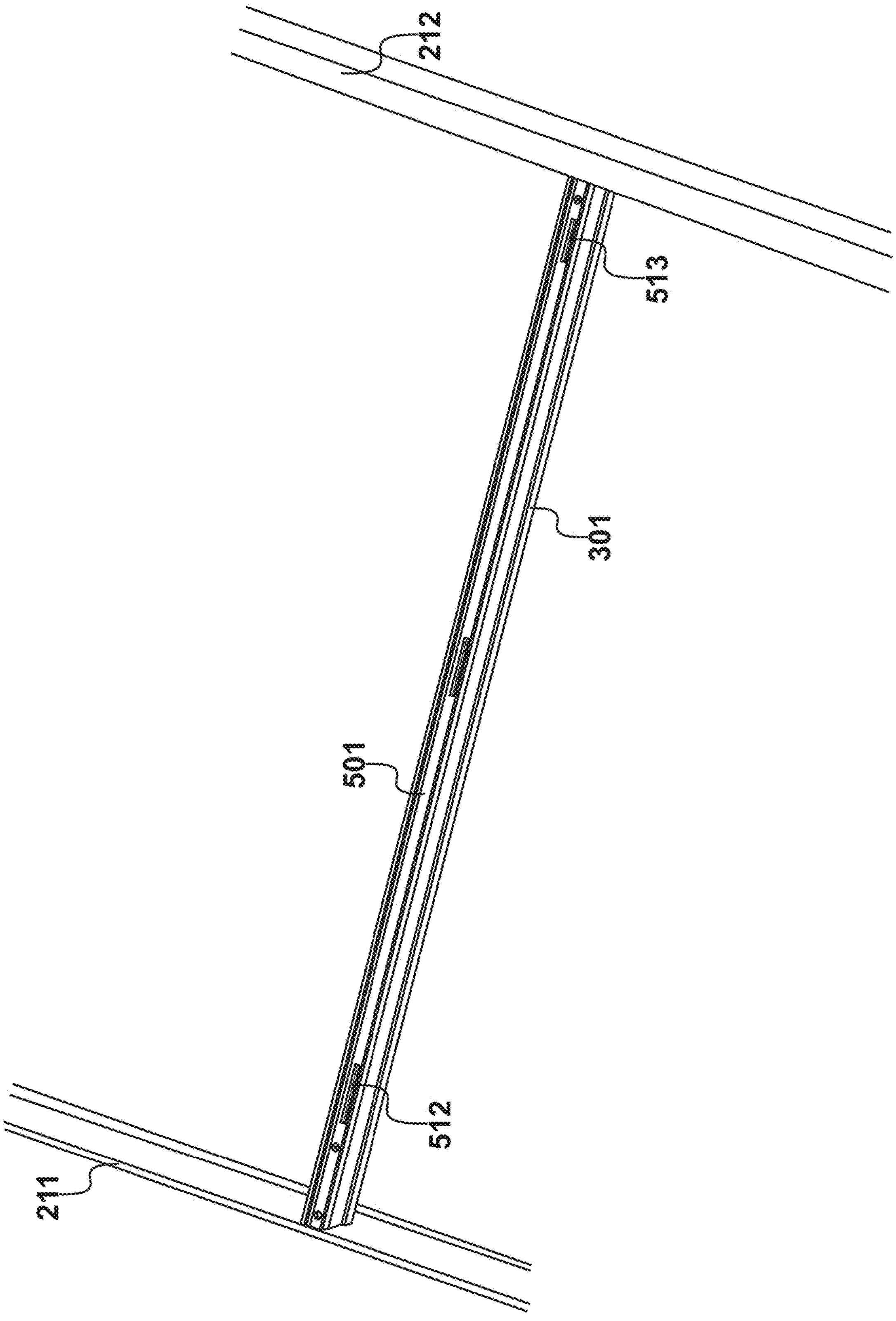
FIG. 6 sows the slidable element inserted into a secured support member.

A slidable element 501 is shown in FIG. 5. The slidable element 501 is slid into the support channel 302 such that it is restrained by the first flange 311 and the second flange 312. The slidable element includes a first slot 511 for receiving a barb that extends from the control panel; as described with reference to FIG. 10. Thus, the barb is locatable through the first slot 511 whereafter the control panel is slidable to engage the barb within the slot 511.

Thus, in an embodiment, a single barb and a single slot are provided. However, in alternative embodiments, one or more additional barbs are provided wherein each one of the additional barbs is provided with a respective slot in the slidable element 501. In the embodiment shown in FIG. 5, a total of three slots are provided (in anticipation of receiving three barbs) consisting of a second slot 512 and a third slot 513; in addition to the first slot 511.

The three slots 511 to 513 may be substantially of the same size. However, in the embodiment shown in FIG. 5, the slots are of mutually different sizes and are configured to receive similarly sized barbs. This arrangement ensures that the control panel can only be received in the correct orientation. Thus, in the embodiment of FIG. 5, the first slot 511 is larger than the third slot 513 and the second slot 512 is larger than the first slot 511.

The slidable element 501 also includes a first tapped hole 521 for receiving a first grub screw along with a second tapped hole 522 for receiving a second grub screw. These grub screws are tightened to secure the slidable element 501, as described with reference to FIG. 16.

FIG. 6

After the slidable element 501 has been inserted into the channel 302, the support member 301 is secured within the structure shown in FIG. 2. Thus, in this example, the support member 301 is secured between the first primary support 211 and the second primary support 212.

FIG. 7

Figure 7:
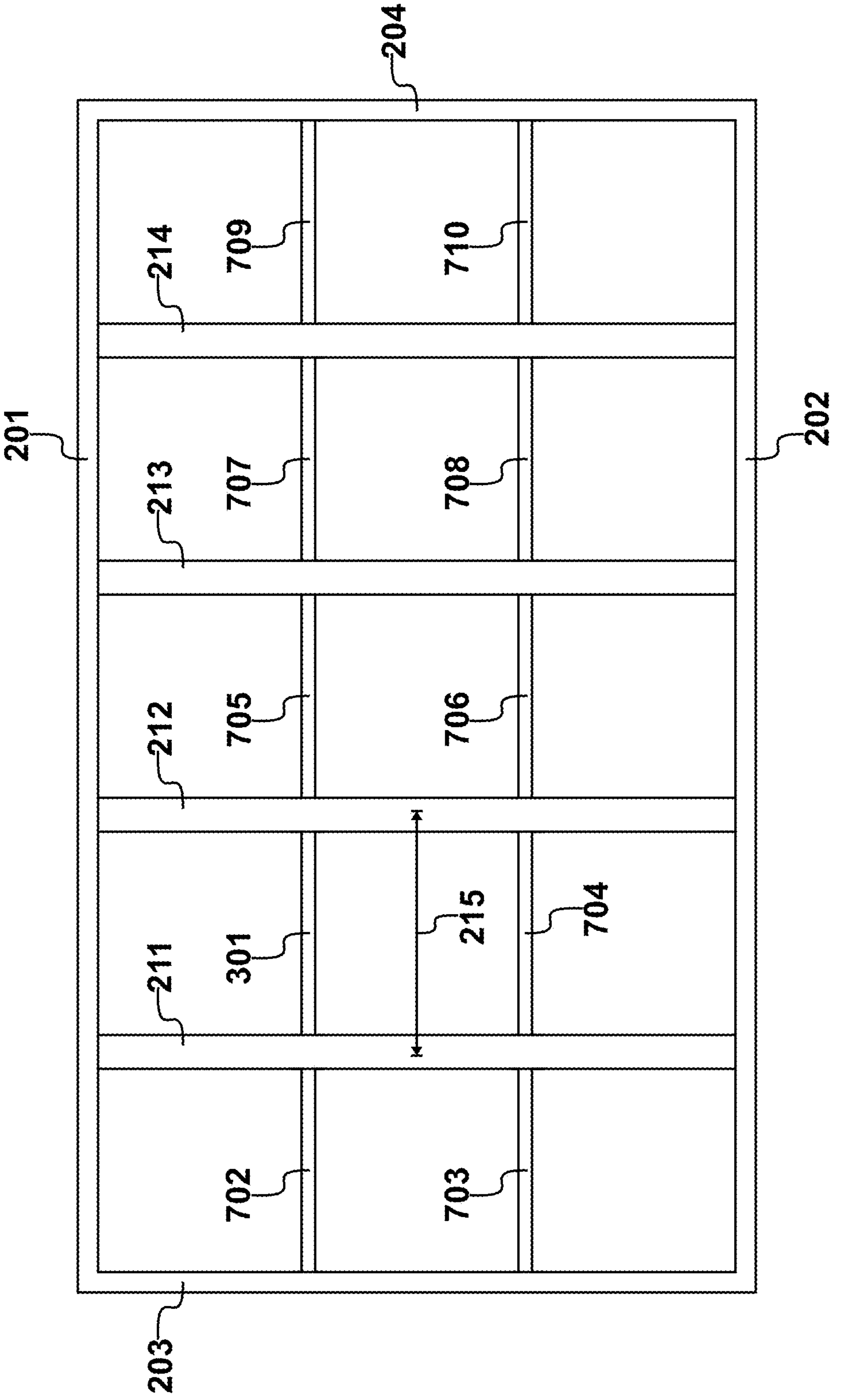
FIG. 7 shows additional support members held between primary supports.

To complete the structure for receiving an array of control panels, further support members, similar to support member 301, are introduced into the structure. Thus, as shown in FIG. 7, this now includes a second support member 702 to a tenth support member 710.

FIG. 8

Figure 8:
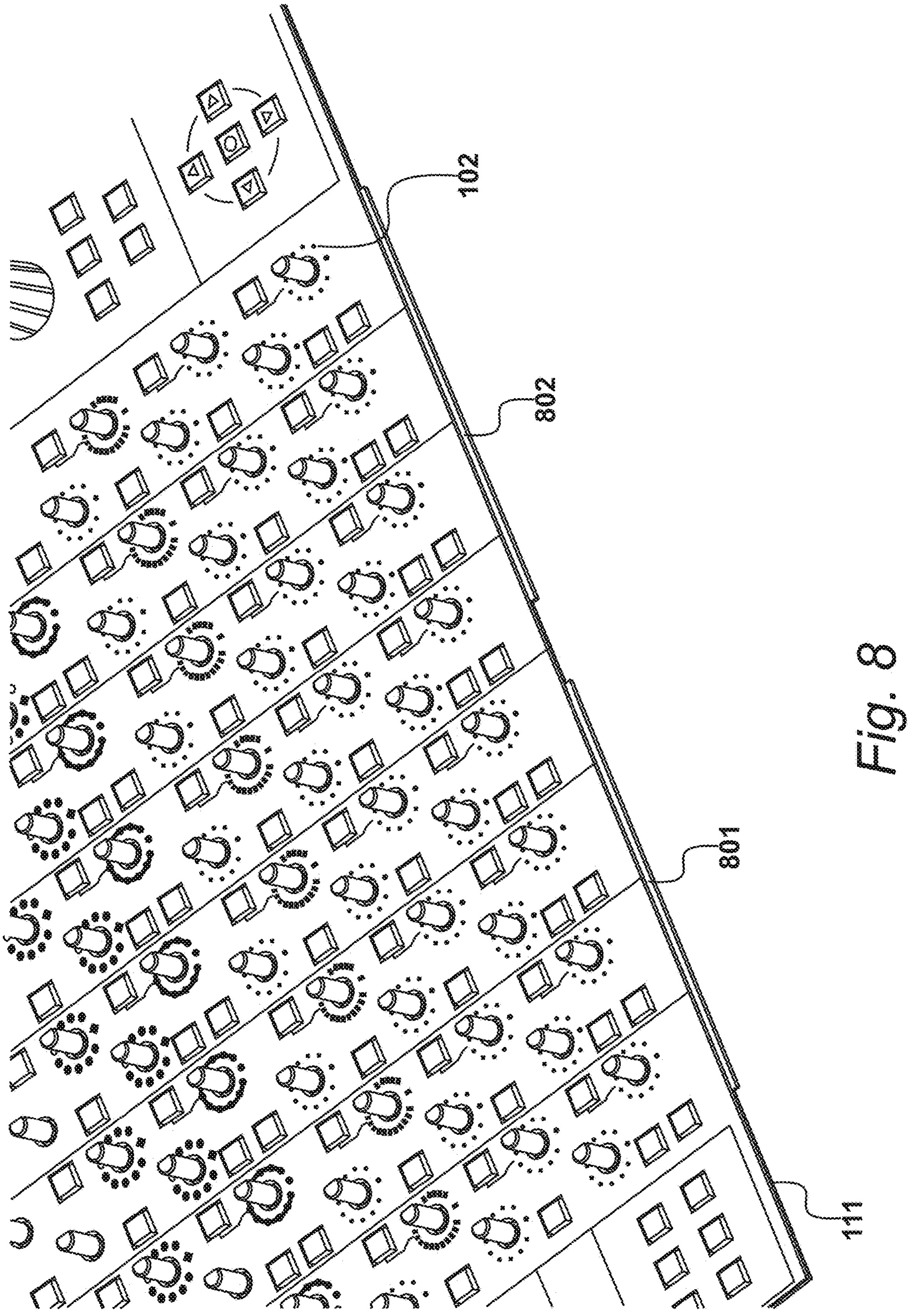
FIG. 8 shows the lower edge of a control panel.

The first control panel 102 is shown in FIG. 8. At its lower edge 111 the control panel 102 presents a first tongue 801 and a second tongue 802.

The tongues 801 and 802 may be received under an adjacent lower control panel to facilitate pivoting and barb insertion. In this way, the control panels do not require an additional perimeter portion to facilitate attachment; allowing more of the available space to be used for supporting operator-activated controls.

FIG. 9

Figure 9:
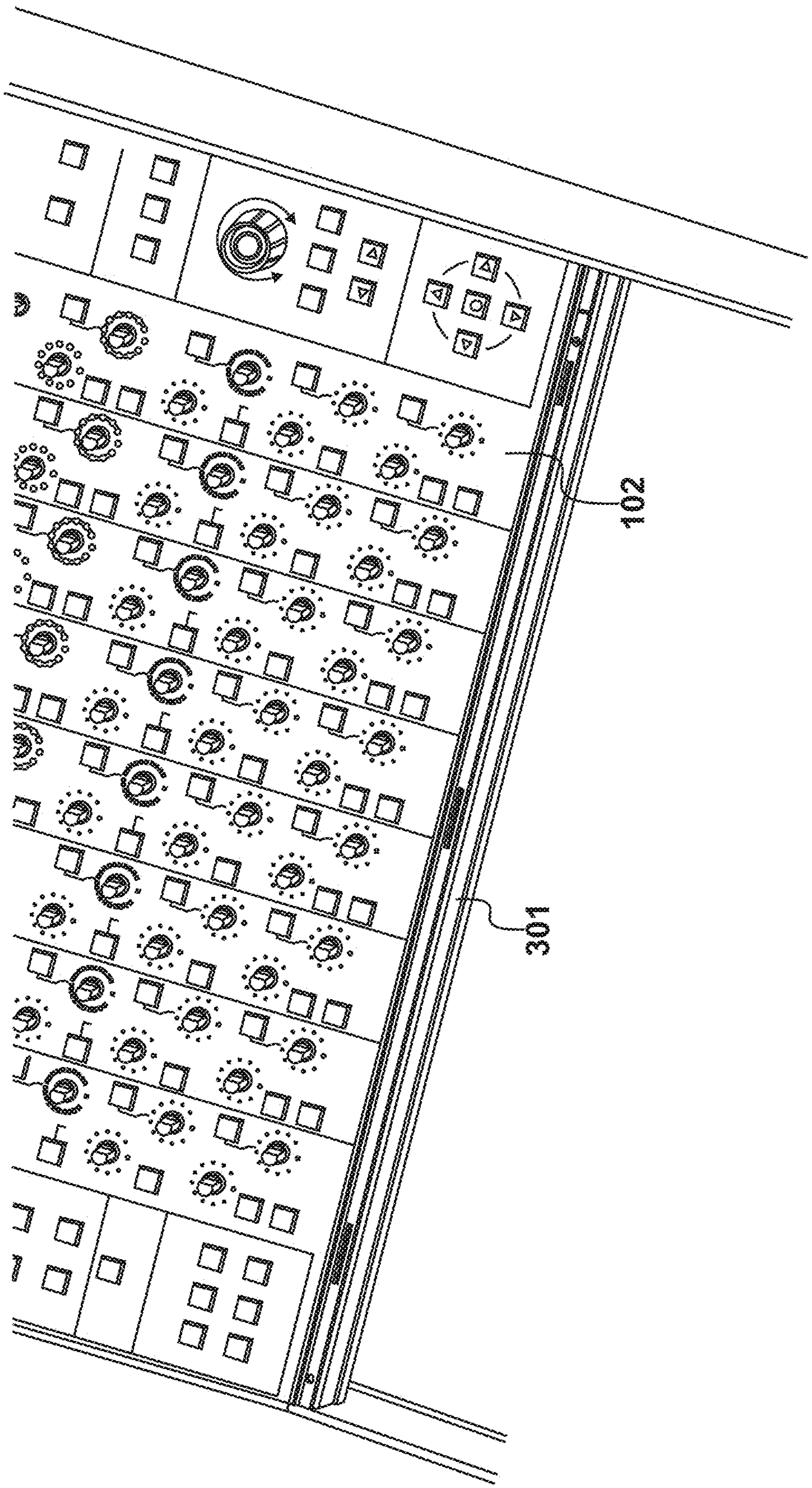
FIG. 9 shows a secured control panel and a support member.

As illustrated in FIG. 9, after attachment of an upper control panel 102, an adjacent control panel can be removed, given that the upper control panel is now firmly held in place by its own respective barbs. Thus, while optimizing the available working space, it is still possible to remove and replace individual control panels without disrupting the positioning of any of the other control panels within the equipment.

FIG. 10

Figure 10:
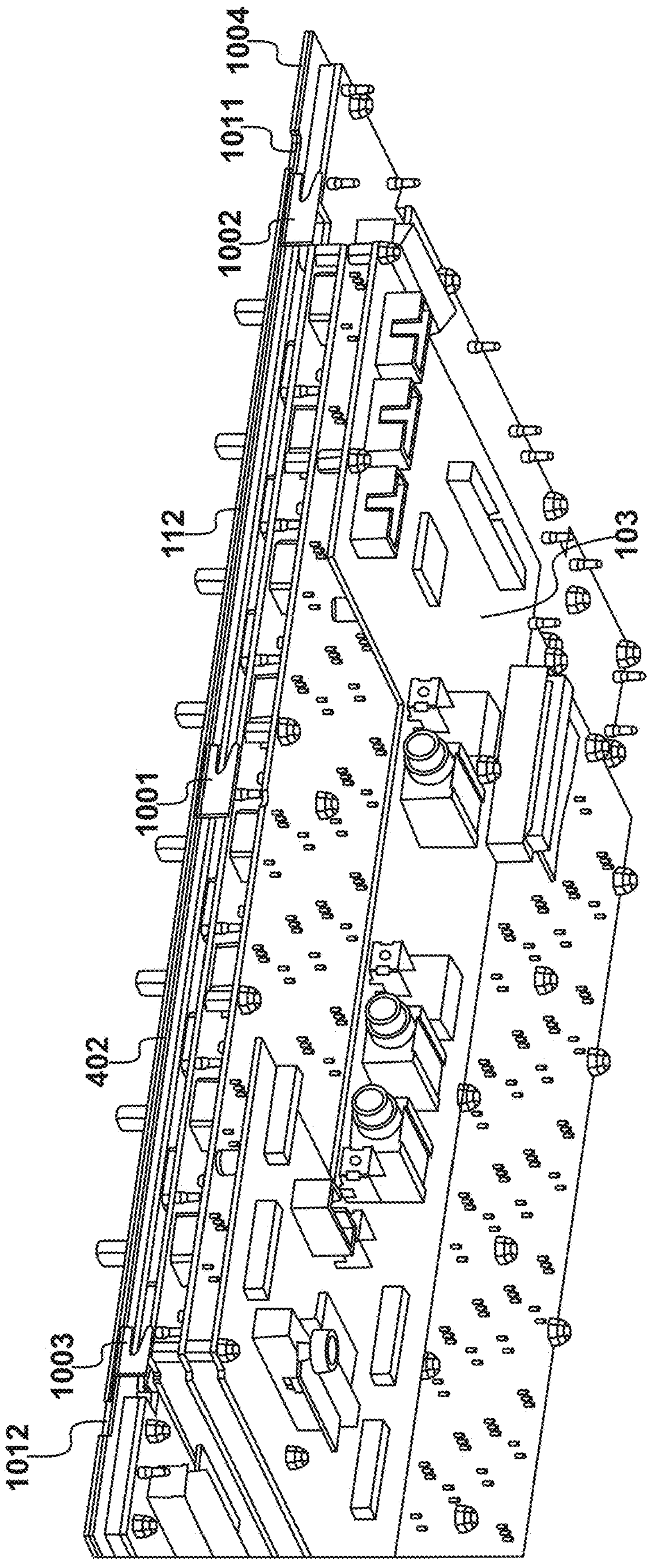
FIG. 10 shows the underside of a control panel with barbs.

The underside of the second control panel 103 is shown in FIG. 10. The second control panel 103 also includes tongues, similar to those described with reference to FIG. 8, to facilitate pivoting of the control panel 103 about its lower edge. As the upper edge 112 is rotated downwards, barbs extending from the upper edge 112 are located within respective slots in the slidable element 501. In this embodiment, a first barb 1001 is provided along with a second barb 1002 and a third barb 1003. These engage within the first slot 511, the second slot 512 and the third slot 513 respectively.

The control panel includes a metal control surface 1004 that includes holes for receiving control devices such as knobs and sliders, as is well known in the art. In this embodiment, the barbs are formed as extensions of this metal control surface and then forced into a downward orientation as shown in FIG. 10. In an alternative embodiment, a separate attachment rod is attached to the control surface by means of screws entering attachment tags. Again, this results in one or more barbs extending vertically downwards from the upper edge 112 of the control panel.

A first grub screw is received within the first tapped hole 521 and a second grub screw is received within the second tapped hole 522. The grub screws 521/522 are tightened to force the slidable element towards the first flange 311 and the second flange 312 to secure the control panel, after the control panel itself has been slid into position. Access to the first grub screw and the second grub screw is achieved, respectively, via a first cutaway 1011 and a second cutaway 1012 in the control panel.

FIG. 11

Figure 11:
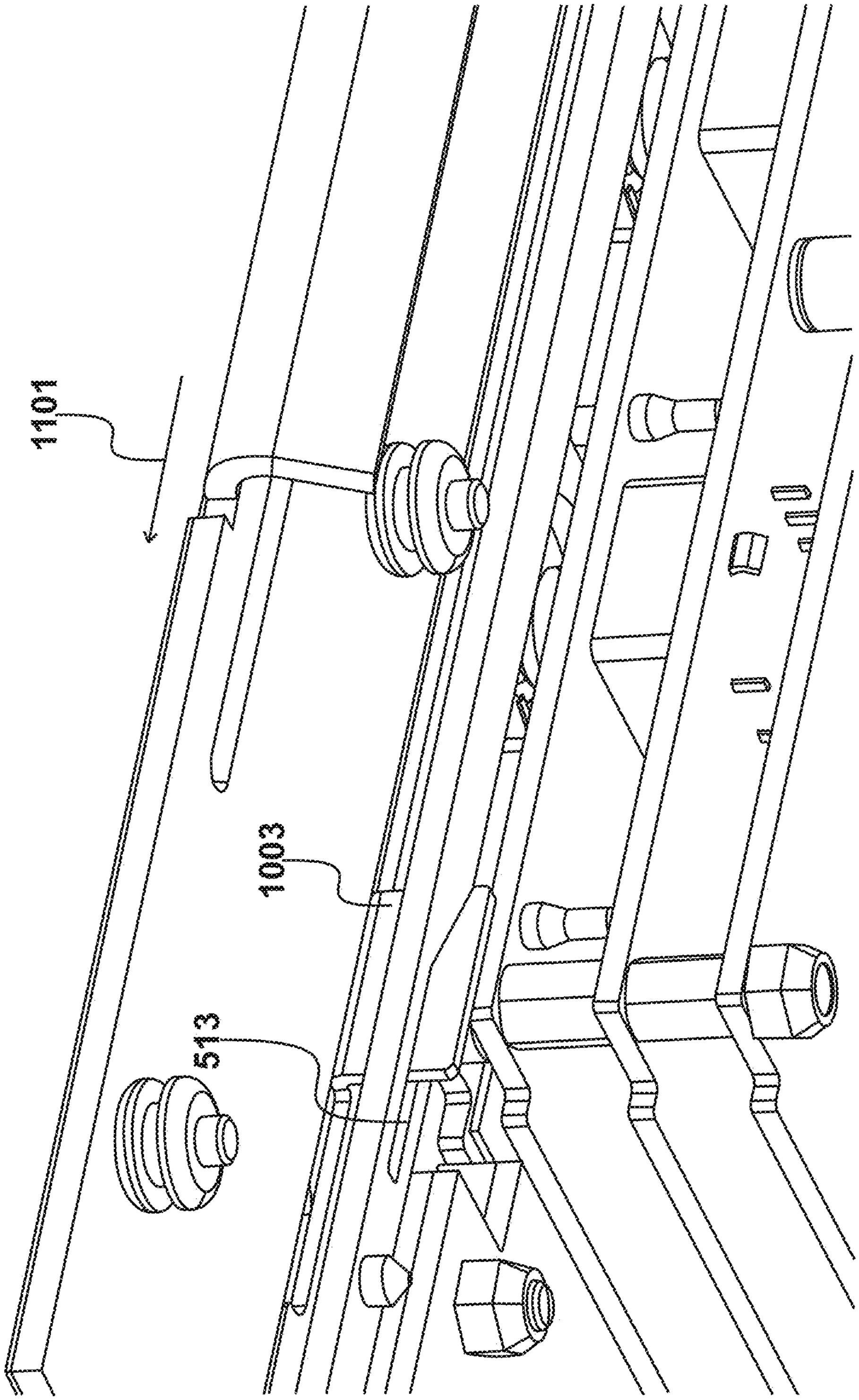
FIG. 11 shows a barb engaged within a slot.

The third barb 1003, engaged within the third slot 513 is shown in FIG. 11. After locating the barbs within the slots, the slidable element 501 is manually pushed sideways in the direction of arrow 1101, as described with reference to FIG. 15. In this way, as shown in FIG. 11, the barbs engage within their respective slots, such that pivoting upwards, to achieve removal of the control panel, is no longer possible.

After sliding the slidable element in the direction of arrow 1101, the barbs are secured within the slots by tightening the grub screws.

FIG. 12

Figure 12:
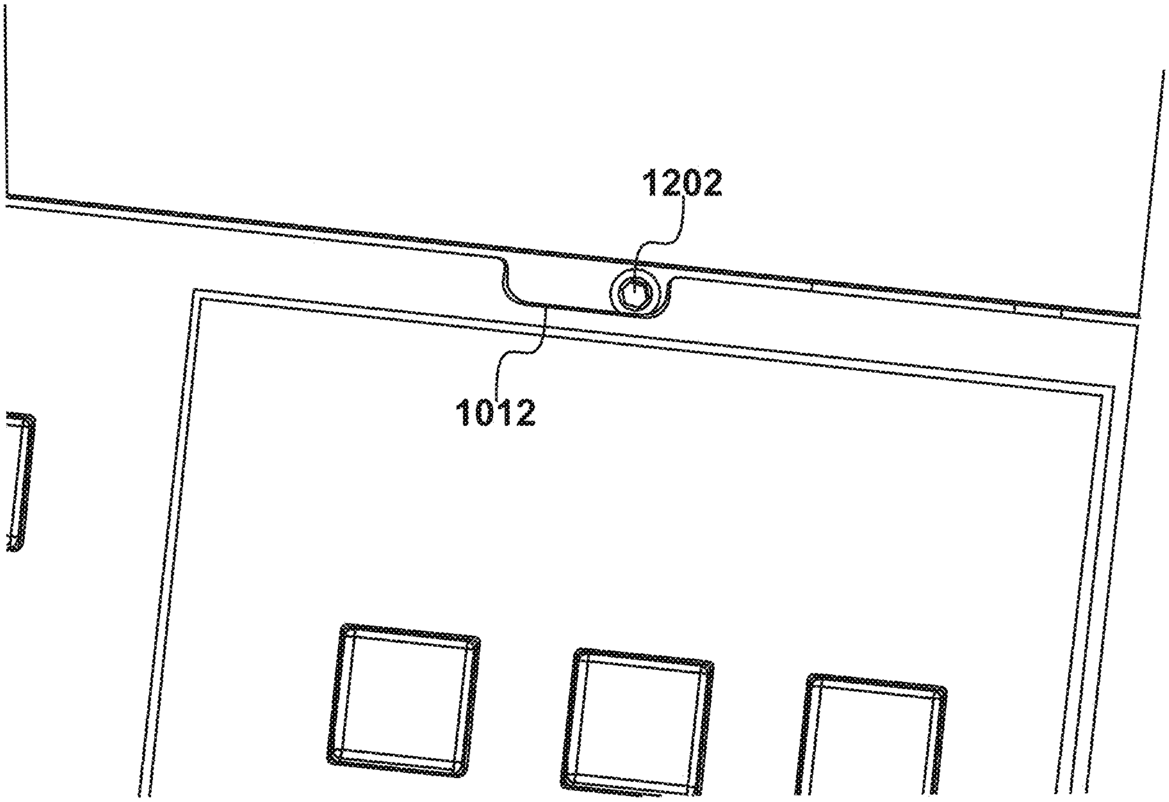
FIG. 12 shows a grub screw accessible via a cut away.

The second cutaway 1012 is shown in FIG. 12. As previously described, this allows a second grub screw 1202 to be deployed through the first cutaway 1011. The grub screws engage with respective tapped holes 521/522 in the slidable element 501. As the grub screws are tightened, they force the slidable element 501 up towards the flanges 311/312, thereby trapping the barbs 1001, 1002 and 1003.

The embodiment described with reference to FIG. 1 to FIG. 12 facilitates the deployment of a method for securing a control panel in a signal mixing system. The signals being mixed can be a many different types, including audio signals, video signals or industrial process control signals etc. The steps comprise locating a barb extending downwards from an upper edge of a control panel, into a slot included in a slidable element. The slidable element is retained within a channel defined by a first flange and a second flange. The method continues by sliding the slidable element to retain the barb located in the slot and securing the slidable element to prevent further sliding of the slidable element, thereby secured the barb.

The lower edge of the control panel may be supported prior to performing the locating step, possibly by the provision of tongues that extend from the lower edge of the control panel. A slot 1012 in the control panel facilitates the sliding of the slidable element. The sliding step may be facilitated by engaging the screws with a tool and applying force against the tool. These screws may be in the form of grub screws having a polygonal orifice, such as a hexagonal orifice, for receiving a cooperating polygonal (hexagonal) tool to facilitate the sliding step and the securing step.

FIG. 13

An alternative embodiment of an apparatus for securing a control panel forming part of a signal mixing system will be described with reference to FIG. 13 to FIG. 16. A barb (described with reference to FIG. 14) extends downwards from an upper edge of a control panel. The apparatus further comprises a slidable element 1301 and a support member 1302 defining a channel 1303 for receiving the slidable element 1301.

Figure 13:
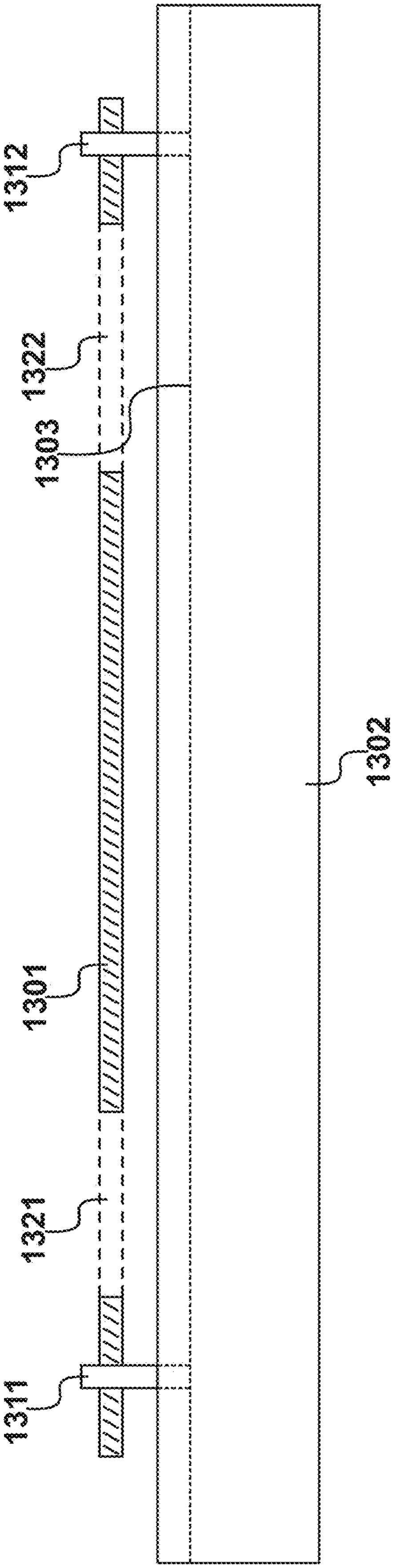
FIG. 13 shows an alternative embodiment of an apparatus for securing a control panel including a first securing device and a second securing device.

The embodiment includes a first securing device 1311 and a second securing device 1312. The channel 1303 includes a first flange and a second flange (as described with reference to FIG. 4) for retaining the slidable element 1301. The slidable element 1301 includes a slot for receiving a barb. In the embodiment of FIG. 13, the slidable element 1301 includes a first slot 1321 and a second slot 1322 for receiving respective barbs. Thus, an embodiment may have a single barb or one or more additional barbs, wherein each one or more additional barb is receivable within a respective slot in the slidable element. In this embodiment, a total of two barbs and two slots are provided.

FIG. 14

Figure 14:
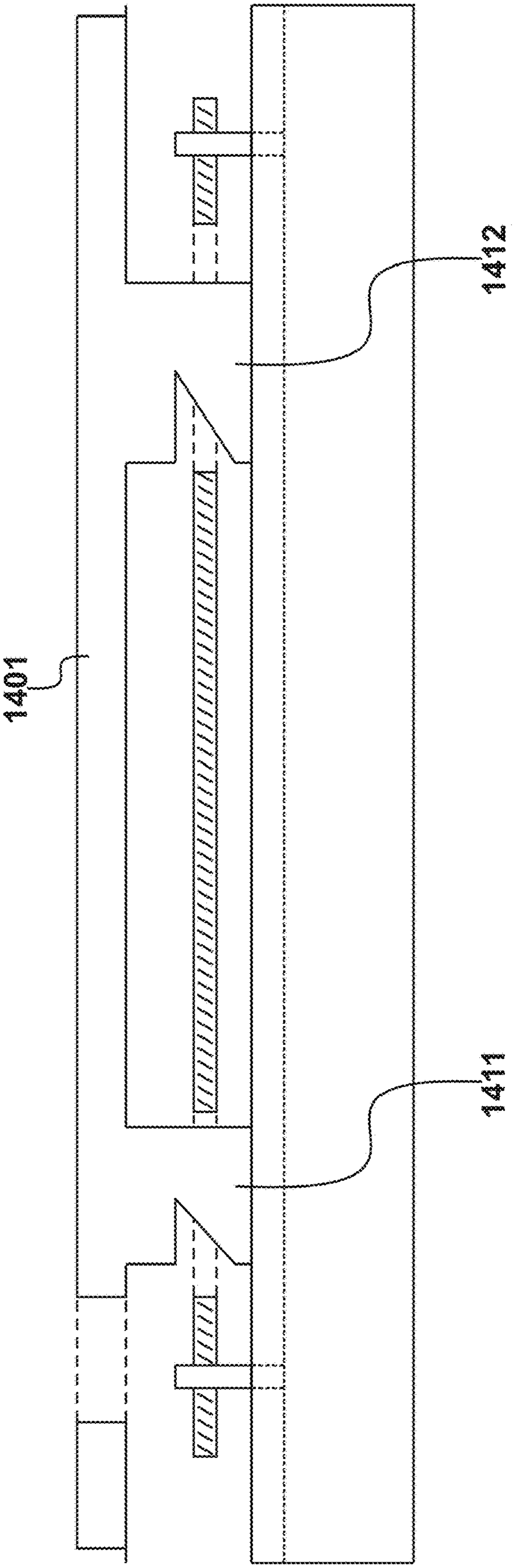
FIG. 14 shows a control panel having a first barb and a second barb extending from an upper edge.

A control panel 1401 is shown in FIG. 14. A first barb 1411 and a second barb 1412 both extend downwards from an upper edge of the control panel 1401. The first barb 1411 is located through the first slot 1321 and the second barb 1412 is located through the second slot 1322.

FIG. 15

Figure 15:
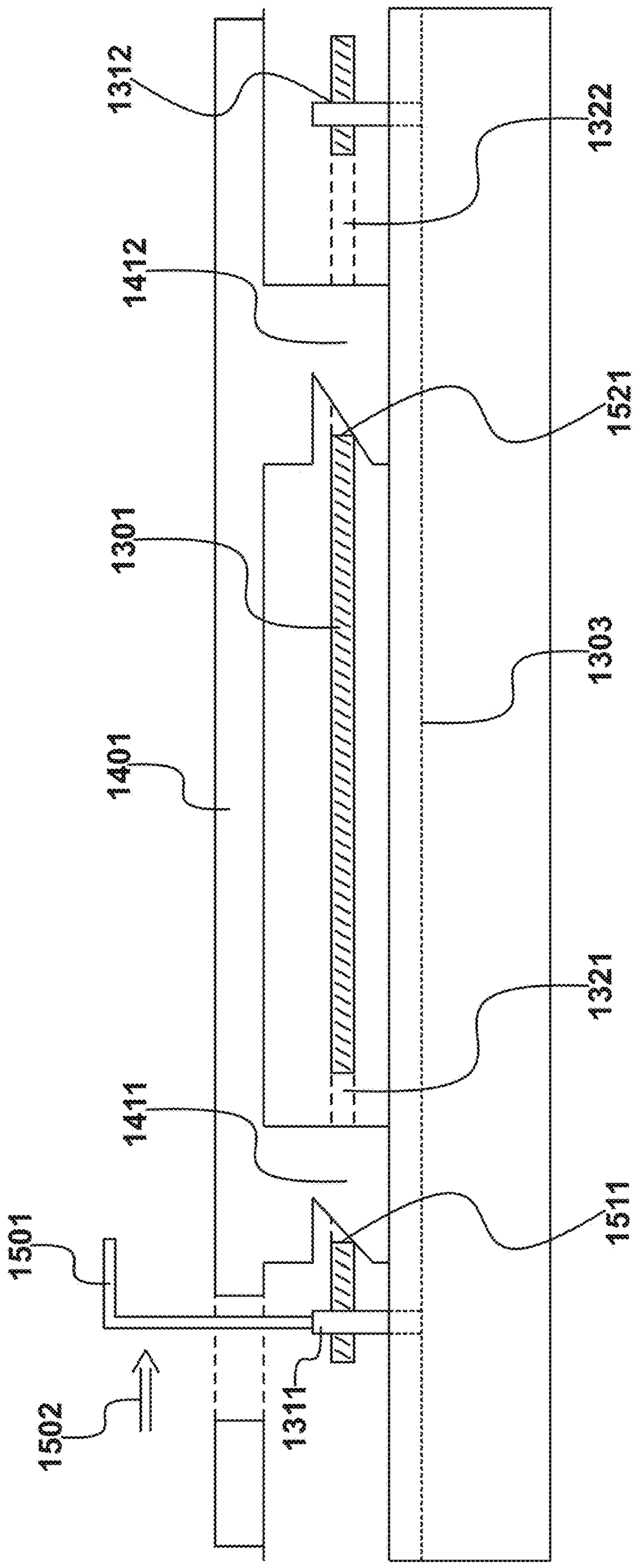
FIG. 15 details the first securing device and the second securing device taking the form of grub screws receivable within tapped holes.

The first securing device 1311 and the second securing device 1312 may take the form of grub screws receivable within tapped holes within the slidable element 1301. Although other types of securing device could be deployed, the grub screws are preferred and are configured such that their heads become flush with the top of the slidable element 1301 when deployed. The grub screws (or bolts) may have a standard single slot or a crosshead slot for receiving an appropriate screwdriver. However, in an embodiment, hexagonal orifices (or substantially polygonal orifices) are provided to receive an appropriately sized hexagonal spanner or key 1501. After engagement of the hexagonal key 1501, as shown in FIG. 15, manual force is applied in the direction of arrow 1502 resulting in the movement of the slidable element 1301 until a first edge 1511 of the first slot 1321 abuts against the first barb 1411. Similarly, a first edge 1521 of the second slot 1322 also abuts against the second barb 1412.

FIG. 16

Figure 16:
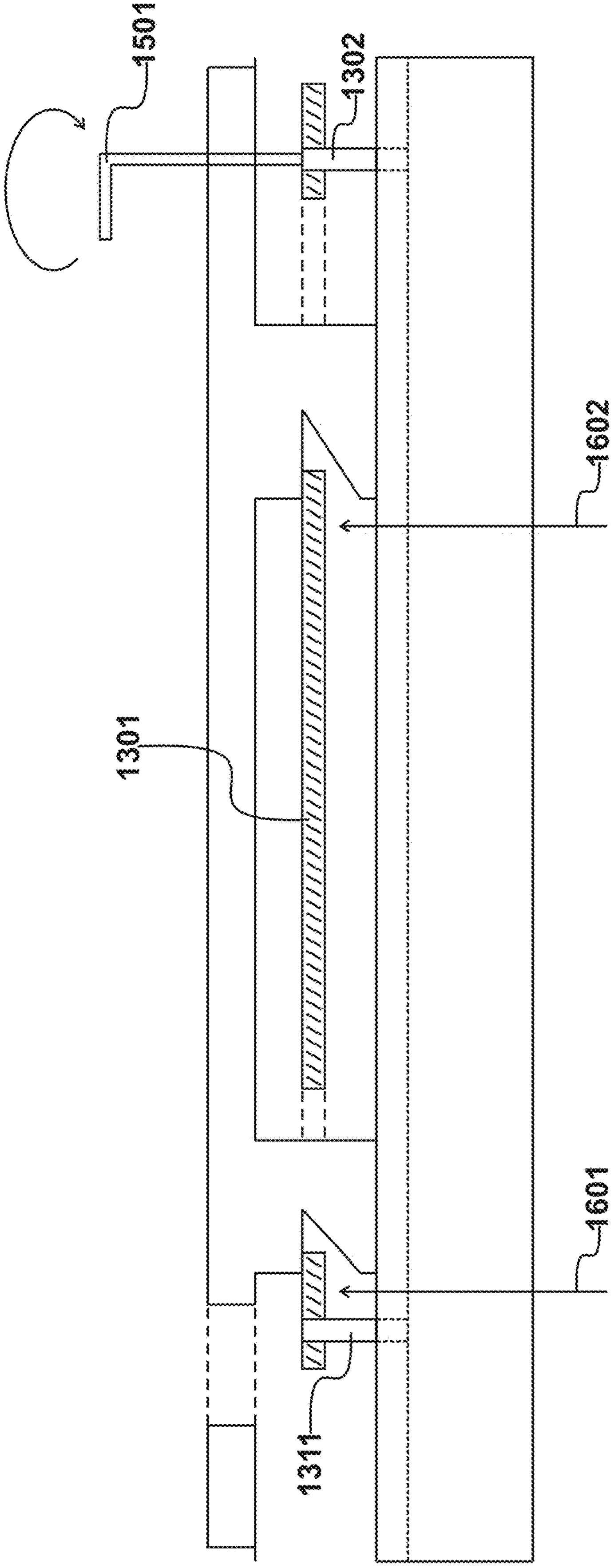
FIG. 16 shows the rotation of a hexagonal key to force movement of the slidable element.

After performing the sliding operation, as described with reference to FIG. 15, the hexagonal key 1501 is then rotated, thereby forcing the slidable element to move upwards in the direction of arrow 1601. As shown in FIG. 16, the hexagonal key 1501 is then moved to the second securing device 1312 and a similar operation is performed to again raise the slidable element 1301 in a direction of arrow 1602. Thus, after tightening the first securing device 1301 and the second securing device 1302, the control panel is restrained to prevent further movement.

The invention claimed is:

1. An apparatus for securing a control panel forming part of a signal mixing system, comprising:

a barb extending downwards from an upper edge of said control panel;

a slidable element;

a support member defining a channel for receiving said slidable element; and a securing device, wherein:

said channel comprises a first flange and a second flange for retaining said slidable element;

said slidable element comprises a slot for receiving said barb; such that:

said barb is locatable through said slot;

said slidable element is slidable to retain said barb after being located through said slot; and said securing device is operated to prevent further sliding of said slidable element to secure said barb after said barb has been retained by said slidable element;

said channel comprises a first channel wall and a second channel wall;

said first flange extends from said first channel wall and said second flange extends from said second channel wall; and said first channel wall and said second channel wall are of different sizes to facilitate securing of a second inclined control panel.

2. The apparatus of claim 1, further comprising one or more additional barbs, wherein each said one or more additional barbs is receivable within a respective slot in said slidable element.

3. The apparatus of claim 2, comprising a total of three barbs and three slots.

4. The apparatus of claim 3, wherein said barbs are of mutually different sizes, with respective slots also being of mutually different sizes.

5. The apparatus of claim 1, wherein said support member is secured between a first primary support and a second primary support.

6. The apparatus of claim 5, wherein one or more additional support members are secured between said first primary support and said second primary support.

7. The apparatus of claim 6, wherein said control panel is secured between adjacent support members.

8. The apparatus of claim 5, wherein said first primary support and said second primary support are secured to a support frame.

9. The apparatus of claim 1, wherein:

said control panel comprises a metal control surface;

said metal control surface comprises holes for receiving control devices; and said barb is formed as an extension of said metal control surface.

10. The apparatus of claim 1, wherein said securing device comprises one or more screws;

each said one or more screws is retained within a respective tapped hole within said slidable element; and operation of said securing device comprises tightening said one or more screws.

11. The apparatus of claim 10, wherein each said one or more screws is accessed via a respective slot in said control panel.

12. A method of securing a control panel in a signal mixing system, comprising steps of:

supporting a lower edge of said control panel, wherein a tongue extends from said lower edge to facilitate said supporting step;

locating a barb extending downwards from an upper edge of said control panel after said supporting step, into a slot comprised in a slidable element, wherein said slidable element is retained within a channel defined by a first flange and a second flange;

sliding said slidable element to retain said barb located in said slot; and securing said slidable element to prevent further sliding of said slidable element, thereby securing said barb.

13. The method of claim 12, wherein said sliding step is facilitated by a second slot in said control panel.

14. The method of claim 13, wherein said securing step is achieved by tightening one or more screws engaged within tapped holes present within said slidable element.

15. The method of claim 14, wherein said one or more screws are engaged to perform said sliding step prior to said securing step.

16. The method of claim 15, wherein said one or more screws are grub screws having a polygonal orifice for receiving a cooperating polygonal key to facilitate said sliding step and said securing step.

17. An apparatus for securing a control panel forming part of a signal mixing system, comprising:

a barb extending downwards from an upper edge of said control panel;

a slidable element;

a support member defining a channel for receiving said slidable element; and a securing device, wherein:

said channel comprises a first flange and a second flange for retaining said slidable element;

said slidable element comprises a slot for receiving said barb; such that:

said barb is locatable through said slot;

said slidable element is slidable to retain said barb after being located through said slot; and said securing device is operated to prevent further sliding of said slidable element to secure said barb after said barb has been retained by said slidable element;

said support member is secured between a first primary support and a second primary support; and one or more additional support members are secured between said first primary support and said second primary support.

18. The apparatus of claim 17, wherein said control panel is secured between adjacent support members.

19. The apparatus of claim 17, wherein said first primary support and said second primary support are secured to a support frame.

20. The apparatus of claim 17, wherein:

said channel comprises a first channel wall and a second channel wall;

said first flange extends from said first channel wall and said second flange extends from said second channel wall; and said first channel wall and said second channel wall are of a similar size, to facilitate securing of a second co-planar control panel.

* * * * *